United States Patent [19]
Park et al.

[11] Patent Number: 6,101,302
[45] Date of Patent: Aug. 8, 2000

[54] GRATING-ASSISTED VERTICAL CODIRECTIONAL COUPLER HAVING PAIR GRATING STRUCTURE

[75] Inventors: Chan Yong Park; Dug Bong Kim; Seung Won Lee; Jeong Soo Kim, all of Daejeon, Rep. of Korea

[73] Assignees: Electronics and Telecommunications Research Institute, Daejeon; Korea Telecom, Seoul, both of Rep. of Korea

[21] Appl. No.: 09/150,695

[22] Filed: Sep. 10, 1998

[30] Foreign Application Priority Data

Dec. 23, 1997 [KR] Rep. of Korea ............... 97-72644

[51] Int. Cl.[7] ............................................. G02B 6/34
[52] U.S. Cl. ........................ 385/37; 385/14; 385/40; 385/130; 385/131
[58] Field of Search .................... 385/37, 39–43, 385/95, 96, 147, 14, 130, 131

[56] References Cited

U.S. PATENT DOCUMENTS

| | | | |
|---|---|---|---|
| 5,396,365 | 3/1995 | Gustavsson | 359/337 |
| 5,515,461 | 5/1996 | Deri et al. | 385/30 |
| 5,615,008 | 3/1997 | Stachelek | 385/37 X |
| 5,621,828 | 4/1997 | Baets et al. | 385/14 |
| 5,764,831 | 6/1998 | Lauzon | 385/43 |
| 5,883,990 | 3/1999 | Sasaoka et al. | 385/37 |
| 5,940,568 | 8/1999 | Losch | 385/37 X |

*Primary Examiner*—Phan H. Palmer
*Attorney, Agent, or Firm*—Jacobson, Price, Holman & Stern, PLLC

[57] ABSTRACT

The present invention relates to an optical filter for selecting a wavelength to be used in an optical communication and optical switching equipment and, more particularly, to an optical filter in order to reduce a sidelobe deteriorating its characteristics. The optical filter according to the present invention includes a plurality of pair gratings formed in a cladding layer, wherein a period of the grating pairs is constant throughout the optical filter, wherein the pair gratings are divided into two unit gratings, and wherein intervals between unit grating within pair grating are spatially different.

5 Claims, 4 Drawing Sheets

GRATING-ASSISTED VERTICAL CODIRECTIONAL COUPLER HAVING PAIR GRATING STRUCTURE

BACKGROUND OF THE INVENTION

1. Field of the Invention

The present invention relates to an optical filter for selecting a wavelength to be used in an optical communication and an optical switching equipment and, more particularly, to an optical filter preventing a sidelobe deteriorating its characteristics, using pair grating inserted between waveguides.

2. Description of Related Art

Generally, the Grating-Assisted Vertical Codirectional Coupler (GACC) filter fabricated on semiconductor materials has been used as an optical filter because the semiconductor material has a good integration with optical elements and has an advantage of a fast wavelength variation.

As shown in FIG. 1, a conventional GACC includes a first waveguide (InGaAsP) 12 formed on an n-InP substrate 11, an n-InP cladding layer 14 formed on the first waveguide 12, a second waveguide (InGaAsP) 15 formed on the n-InP cladding layer 14, a p-InP cladding layer 16 formed on the second waveguide 15 and gratings 13 inserted into the n-InP cladding layer 14.

This GACC optical filter generates an optical coupling by inserting gratings 13 into the n-InP cladding layer 14 which is between the first and second waveguides 12 and 15. Accordingly, the conventional GACC optical filter extracts optical signal incident from a waveguide and then uses the extracted signal in another waveguide as an optical signal. At this time, the gratings 13 serves as a coupler to couple optical signals between the first and second waveguides 12 and 15. When the first and second waveguides 12 and 15 are not symmetrical, only a specific wavelength is coupled to another waveguide.

The conventional GACC optical filter is able to alter the wavelength of light from the second waveguide 15, by changing the refractive index of the waveguide using the current injection through the pn junction or the electric effect. In this wavelength-variable optical filter, if the (i+1)-th or (i−1)-th wavelength is outputted to the second waveguide 15 while the i-th wavelength ($\lambda$) is outputted to the second waveguide 15 or vice versa, an error may be generated in detecting the i-th wavelength.

Accordingly, in order to output only the i-th wavelength to the second waveguide 15, the optical wavelength spectrum coupled from the first waveguide 12 to the second waveguide 15 should not be outputted at the (i+1)-th or (i−1)-th wavelength.

However, in the structure of the optical filter, as shown in FIG. 1, the output spectrum coupled to the second waveguide 15 is shown in dotted line of FIG. 4 to the optical wavelength change. The coupling power has small peak values on the left and right sides of the middle wavelength, what is called "sidelobe." Since neighboring channels are affected along the sidelobe, it is essential to remove the sidelobe in implementing an available optical filter. This sidelobe arises from the finite coupling length of the filter device and the constant efficiency of the optical coupling therebetween.

SUMMARY OF THE INVENTION

An object of the present invention is to provide an optical filter to prevent a sidelobe.

Another object of the present invention is to provide an optical filter capable of precisely controlling its features.

In accordance with an aspect of the present invention, there is provided an optical filter comprising a plurality of pair gratings formed in a cladding layer, wherein a period of the pair gratings is constant throughout the optical filter, wherein the pair grating includes two unit gratings and wherein an interval between two unit gratings within the pair grating is spatially different from one another.

BRIEF DESCRIPTION OF THE DRAWINGS

Other objects and aspects of the present invention will become apparent from the following description of the embodiments with reference to the accompanying drawings, in which.

DETAILED DESCRIPTION OF THE REFERRED EMBODIMENTS

Hereinafter, the present invention will be described in detail with reference to the accompanying drawings.

Figure 1:
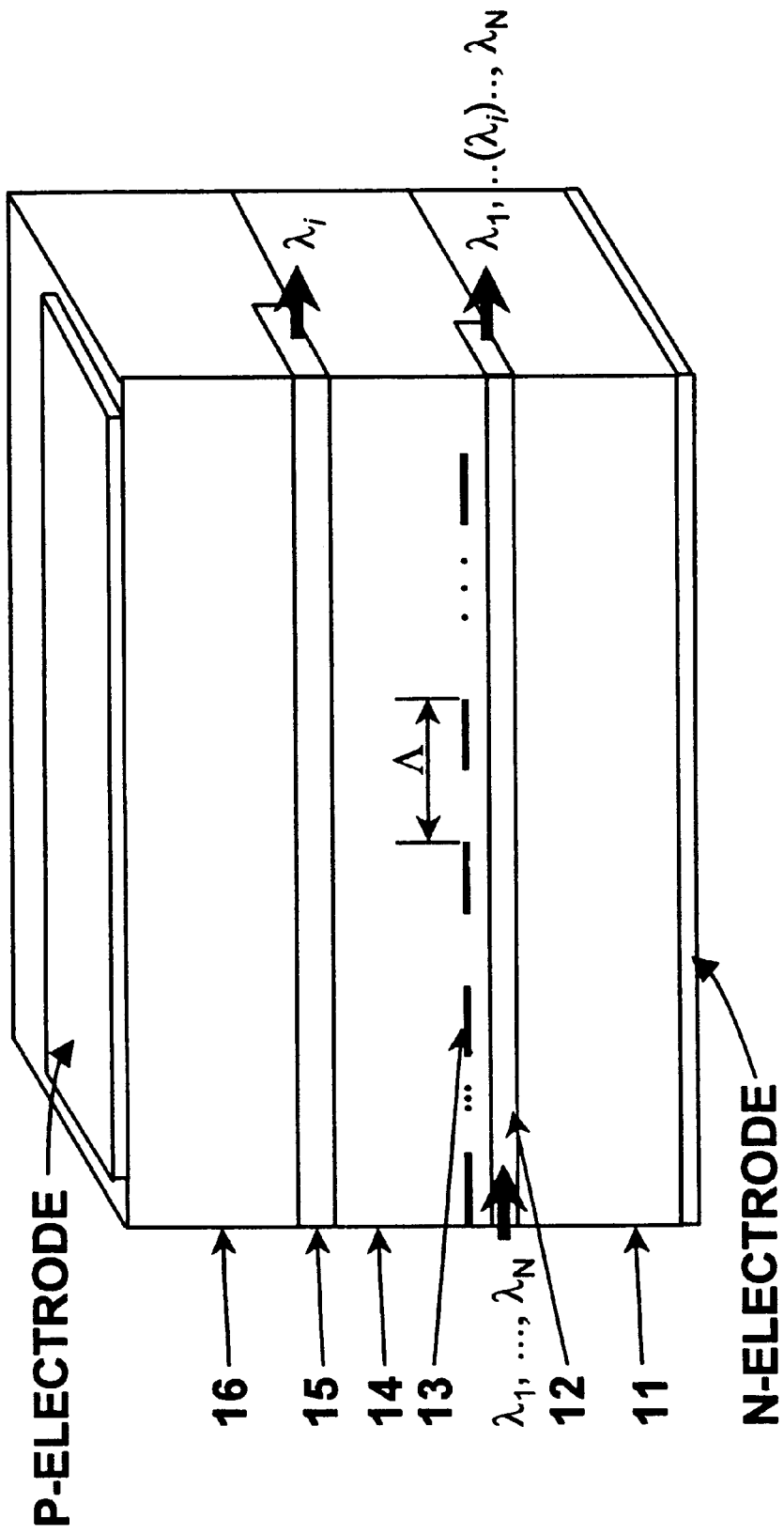
FIG. 1 is a perspective view illustrating a conventional GACC optical filter.
Figure 2:
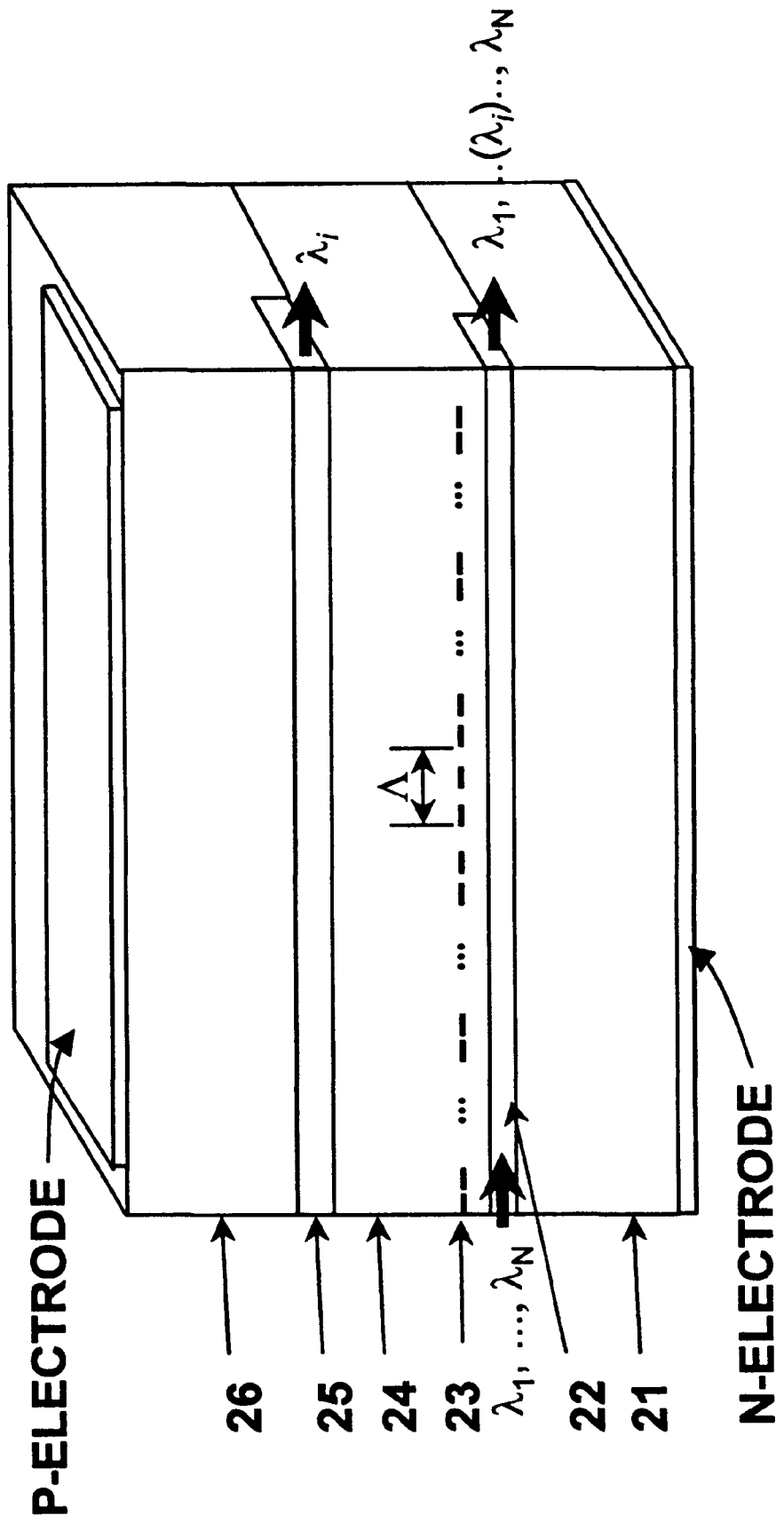
FIG. 2 is a perspective view illustrating an GACC optical filter according to the present invention.

Referring to FIG. 2, the GACC optical filter according to the present invention has a similar cross section to that of FIG. 1. The GACC optical filter according to the present invention is formed on an n-InP substrate 21. A first waveguide (InGaAsP) 22 is formed, with a spatial restriction, on an n-InP substrate 21 at a thickness of 0.3 to 0.8 $\mu$m, a width of 1 to 3 $\mu$m and a length of 3 to 10 mm. An n-InP layer 24 including a pair grating structure is formed on the first waveguide 22. InGaAsP gratings 23 in the pair grating structure are formed over 0.1 to 0.5 $\mu$m from the surface of the first waveguide 22, being formed at a thickness of 0.02 to 0.2 $\mu$m with a periodicity of 20 to 60 $\mu$m. A second InGaAsP waveguide layer 25 is formed on the n-InP layer 24 at a thickness of 0.2 to 1 $\mu$m, a width of 1 to 5 $\mu$m and a length of 3 to 10 mm. A p-InP layer 26 is formed on the second InGaAsP waveguide layer 25. Further, the GACC optical filter according to the present invention may include an n-InP buffer layer (not shown) formed on the n-InP substrate 21 and P$^+$-InGaAs contact layer (not shown) formed on the p-InP layer 26.

Figure 3:
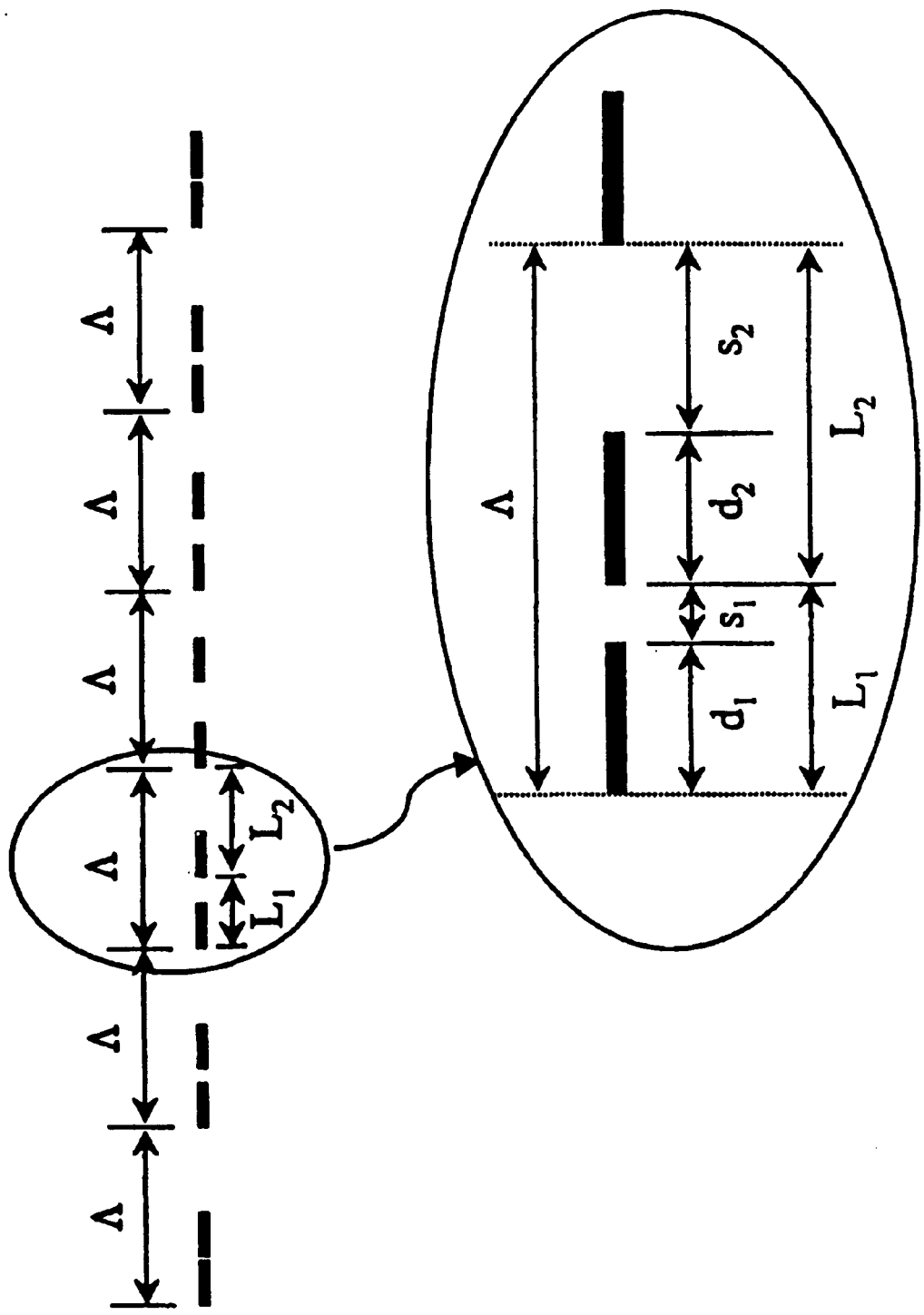
FIG. 3 is a schematic view illustrating a pair grating structure according to the present invention.

FIG. 3 is a schematic view illustrating a pair grating structure according to the present invention. The grating period in the conventional GACC optical filter is defined as an interval between neighboring gratings. However, the period of the grating pair in the present invention is defined as an interval $\Lambda$ which is from one end of a grating pair to the other end of a neighboring grating pair, i.e., $L_1+L_2$. The intervals $s_1$ between two gratings in the grating pairs are different from one another. In particular, in the middle of the optical filter, the interval $s_1$ is equal to the interval $s_2$ between the grating pairs and the interval $s_1$ is much less than the interval $s_2$ at both the ends of the optical filter. The much more the grating pairs are closely positioned at the end of the optical filter, the narrower the intervals between two gratings in the grating pairs are. In other words, the relationship between the gratings is given by:

$$L_1+L_2=\Lambda$$

$$d_1=d_2$$

$$d_1+s_1=L_1$$

$$d_2+s_2=L_2$$

$s_1=s2$ (in the middle of the optical filter)

$s_1<<s_2$ (at both the ends of the optical filter)

As apparent from the above relationship, the interval of two grating within pair grating in the middle of the optical filter is the same as that of the conventional optical filter, but as approaching to the end of the optical filter, the intervals between gratings within the pair grating become narrower even if the period of the pair grating is constant.

Figure 4:
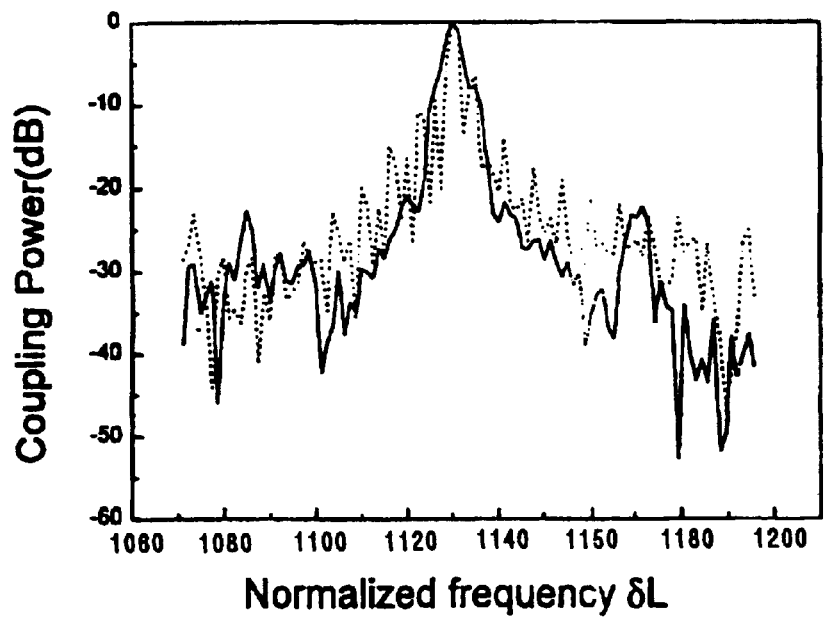
FIG. 4 is a plot showing the characteristic of coupling power to optical frequency in the GACC optical filter according to the present invention and in the conventional GACC optical filter.

As shown in FIG. 4, the optical filter according to the present invention spatially controls the optical coupling coefficient between the two waveguides, thereby controlling the sidelobe up to 10 dB (about ten times). Generally, when the optical coupling coefficient is constant in all spaces, the transmission feature according to the frequency depends on the Fourier transform of the optical coupling coefficient and then the sidelobe of about −6 dB may occur. According to the theory proposed by Alferness, et al [IEEE Journal of Quantum Electronic, vol. 14, pp. 843–847 (1978)], the sidelobe may be reduced up to below −30 dB, provided the optical coupling coefficient becomes larger in the middle of interaction region of the optical filter and it becomes smaller at both the ends of the optical filter.

In the present invention, the interval between two gratings within pair grating is the same as the interval of the conventional grating, and the interval between two gratings within pair grating becomes narrower as approaching to the both ends of the filter device, and the period $\Lambda$ is constant over the entire filter. Accordingly, the optical coupling coefficient is spatially controlled without effective index change, reducing the sidelobe.

Figure 5:
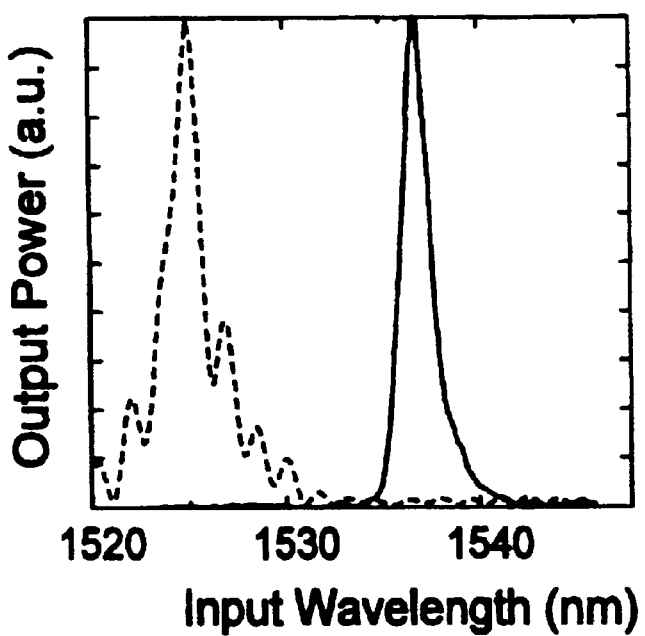
FIG. 5 is a plot showing the realized experimental characteristic of output to input wavelength in the GACC optical filter according to the present invention and in the conventional GACC optical filter.

Referring to FIG. 5 showing the measured transmission characteristic of the fabricated optical filter according to the present invention with that of the conventional GACC optical filter. The dotted line represents the transmission characteristic according to the conventional GACC optical filter having the grating period of 13 $\mu$m (i.e., $d_1=d_2=s_1=s_2=6.5$ $\mu$m). The solid line represents the transmission characteristic according to the present invention having the pair grating structure. In the middle of the filter, where the intervals $d_1$ and $d_2$ are respectively 6.5 $\mu$m, the intervals $s_1$ and $s_2$ are respectively 6.5 $\mu$m. The interval $s_1$ becomes narrower by 0.1 $\mu$m as approaching to both the ends of the filter and the interval $s_2$ becomes wider by 0.1 $\mu$m as approaching to both the ends of the filter. The interval $s_1$ is 0.1 $\mu$m at the last pair grating and the interval $s_2$ is 12.9 $\mu$m between the last two pair gratings, keeping the period of the pair grating, i.e., $L_1+L_2=26$ $\mu$m, constant.

It should be noted that the two filter deice shown in FIG. 5 are simultaneously fabricated in the same wafer. As shown in FIG. 5, the optical filter according to the present invention reduces the sidelobe, as compared with the conventional optical filter.

The present invention reduces the sidelobe, by spatially controlling the phase of the coupled light between two waveguides up to 10 dB. The optical filter according to the present invention improves the crosstalk between the channels of the wavelength division multiplexing communication. Furthermore, the present invention has an advantage that the intervals between the gratings is controlled by the modification of only one mask.

Although the preferred embodiments of the invention have been disclosed for illustrative purposes, those skilled in the art will appreciate that various modifications, additions and substitutions are possible without departing from the scope and spirit of the invention as disclosed in the accompanying claims.

What is claimed is:

1. An optical filters comprising:

a substrate;

a first waveguide formed on the substrate;

a first cladding layer formed on the first waveguide;

a second waveguide formed on the first cladding layer;

a second cladding layer formed on the second waveguide; and a plurality of pair gratings formed in the first cladding layer, wherein a period of the pair gratings is constant throughout the optical filter, wherein the pair grating includes two unit gratings, and wherein an interval between two unit gratings within the pair grating is spatially different from one another.

2. The optical filter in accordance with claim 1, wherein intervals between two unit grating within pair grating becomes narrower, as approaching to both the ends of the optical filter.

3. The optical filter in accordance with claim 1, wherein the optical filter has electrical electrodes to inject current or to adjust an electric filed for controlling a coupling wavelength.

4. The optical filter in accordance with claim 1, wherein a period of pair grating is constant over the optical filter.

5. The optical filter in accordance with claim 1, wherein the optical filter is a Grating-Assisted Vertical Codirectional Coupler.

* * * * *